(12) United States Patent
Taniguchi et al.

(10) Patent No.: US 10,865,830 B2
(45) Date of Patent: Dec. 15, 2020

(54) TAPERED ROLLER BEARING

(71) Applicant: JTEKT CORPORATION, Osaka (JP)

(72) Inventors: Youzou Taniguchi, Kashiwara (JP); Kanichi Koda, Kashiba (JP); Haruo Kimura, Higashiosaka (JP); Yuichi Masuda, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/590,605

(22) Filed: Oct. 2, 2019

(65) Prior Publication Data

US 2020/0116197 A1 Apr. 16, 2020

(30) Foreign Application Priority Data

Oct. 12, 2018 (JP) ................. 2018-193221

(51) Int. Cl.
*F16C 33/36* (2006.01)
*F16C 33/46* (2006.01)
*F16C 19/36* (2006.01)

(52) U.S. Cl.
CPC .......... *F16C 19/364* (2013.01); *F16C 33/467* (2013.01)

(58) Field of Classification Search
CPC ............... F16C 19/364; F16C 33/4623; F16C 33/4629; F16C 33/4635; F16C 33/467; F16C 33/4676; F16C 33/4682
See application file for complete search history.

(56) References Cited

U.S. PATENT DOCUMENTS

2016/0281774 A1 9/2016 Nagai et al.
2018/0245627 A1* 8/2018 Kawai ................. F16C 33/54

FOREIGN PATENT DOCUMENTS

JP        2003139133 A  *  5/2003  .......... F16C 33/4676
JP        2016-180417 A    10/2016
WO  WO-2017208908 A1  * 12/2017  ............ F16C 33/541

* cited by examiner

*Primary Examiner* — Phillip A Johnson
(74) *Attorney, Agent, or Firm* — Oliff PLC

(57) ABSTRACT

A tapered roller bearing includes an inner ring, an outer ring, a plurality of tapered rollers, and an annular cage. The annular cage includes a small-diameter annular portion, a large-diameter annular portion, and a plurality of cage bars that couple the small-diameter annular portion and the large-diameter annular portion together. The cage bar has a first facing surface that faces the outer peripheral surface of the tapered roller that is housed. The first facing surface includes a large-diameter-side facing surface, a small-diameter-side facing surface arranged farther away from the outer peripheral surface of the tapered roller than the large-diameter-side facing surface, and an intermediate facing surface inclined gradually away from the outer peripheral surface of the tapered roller with increasing distance from the large-diameter-side facing surface to the small-diameter-side facing surface.

4 Claims, 9 Drawing Sheets

(AXIAL DIRECTION)

(AXIAL DIRECTION)

(AXIAL DIRECTION)

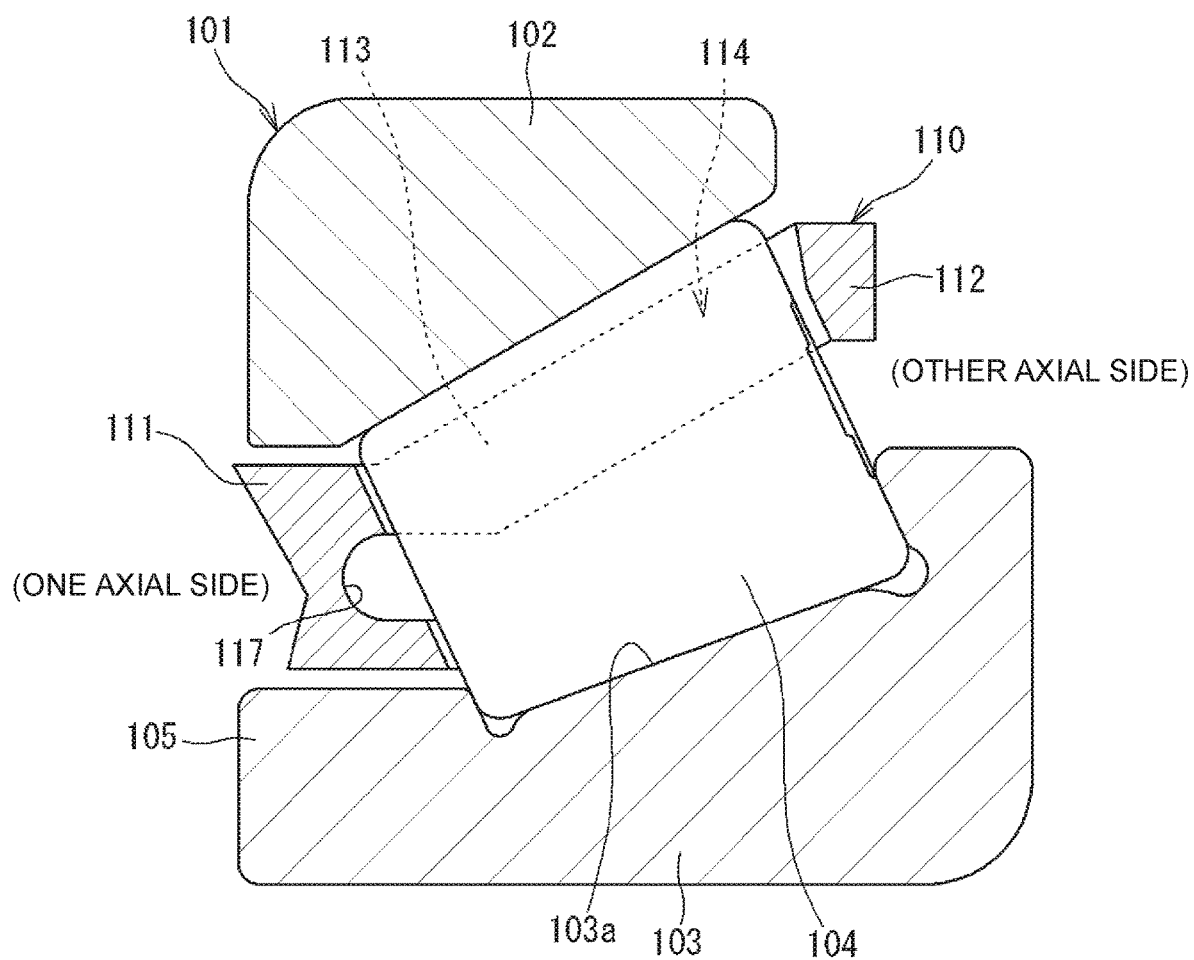

TAPERED ROLLER BEARING

INCORPORATION BY REFERENCE

The disclosure of Japanese Patent Application No. 2018-193221 filed on Oct. 12, 2018 including the specification, drawings and abstract is incorporated herein by reference in its entirety.

BACKGROUND

1. Technical Field

The present disclosure relates to a tapered roller bearing.

2. Description of Related Art

Japanese Unexamined Patent Application Publication No. 2016-180417 (JP 2016-180417 A) discloses a tapered roller bearing including an inner ring, an outer ring, a plurality of tapered rollers, and a cage that retains the tapered rollers with intervals in a circumferential direction. As illustrated in FIG. 9, a cage 110 of a tapered roller bearing 101 includes a small-diameter annular portion 111 on one axial side, a large-diameter annular portion 112 on the other axial side, and a plurality of cage bars 113 that couple the annular portions 111 and 112 together. Spaces each formed between the two annular portions 111 and 112 and between the cage bars 113 adjacent to each other in the circumferential direction are cage pockets 114 that house tapered rollers 104. The cage bar 113 of the cage 110 is formed into a shape that prevents the tapered roller 104 housed in the cage pocket 114 from detaching radially outward.

To assemble the tapered roller bearing 101, the tapered rollers 104 are first housed in the cage pockets 114 of the cage 110, an inner ring 103 is moved along an axial direction from a small-diameter side closer to the assembly of the cage 110 and the tapered rollers 104, and the tapered rollers 104 are positioned on an inner ring raceway surface 103a of the inner ring 103. Then, an outer ring 102 is attached to a radially outer side of the tapered rollers 104. Thus, the assembling of the tapered roller bearing 101 is completed.

In the assembling process described above, the tapered rollers 104 need to climb over a cone front face rib (hereinafter referred to as a small rib) 105 of the inner ring 103 before reaching the inner ring raceway surface 103a. In the related art, the tapered rollers 104 are shifted radially outward by forcefully press-fitting the inner ring 103 along the axial direction on a radially inner side of the plurality of tapered rollers 104. Along with this, the cage 110 is elastically deformed radially outward (diameter is increased). In the technology described in JP 2016-180417 A, a recess 117 is formed in the small-diameter annular portion 111 of the cage 110 in order to prevent damage and a decrease in dimensional accuracy due to the elastic deformation of the cage 110. Thus, the rigidity of the cage 110 is reduced, and the cage 110 is elastically deformed easily.

SUMMARY

In the technology described in JP 2016-180417 A, the cage 110 can elastically be deformed easily, but the elastic deformation amount cannot be reduced. Therefore, there remains a possibility of the damage and the decrease in the dimensional accuracy due to the elastic deformation of the cage 110. Depending on a material for the cage 110, there is a possibility that the rigidity is not sufficiently reduced even though the recess 117 is formed in the small-diameter annular portion 111. In this case, a load cannot sufficiently be reduced when the inner ring 103 is press-fitted along the axial direction on the radially inner side of the plurality of tapered rollers 104. Therefore, it is difficult to assemble the tapered roller bearing.

The present disclosure provides a tapered roller bearing that can easily be assembled while reducing the elastic deformation amount of a cage during the assembling.

A tapered roller bearing according to an aspect of the present disclosure includes an inner ring, an outer ring, a plurality of tapered rollers, and an annular cage. The inner ring includes a small rib and a large rib. The small rib is provided on one axial side and protrudes radially outward. The large rib is provided on the other axial side and protrudes radially outward. The outer ring is arranged on a radially outer side of the inner ring. The plurality of tapered rollers are arranged between the inner ring and the outer ring. The annular cage includes a small-diameter annular portion on the one axial side, a large-diameter annular portion on the other axial side, and a plurality of cage bars that couple the small-diameter annular portion and the large-diameter annular portion together. The annular cage is configured to house each of the tapered rollers between the large-diameter annular portion and the small-diameter annular portion and between the cage bars adjacent to each other in a circumferential direction. The cage bar has a first facing surface that faces an outer peripheral surface of the tapered roller that is housed. The first facing surface includes a large-diameter-side facing surface, a small-diameter-side facing surface, and an intermediate facing surface. The large-diameter-side facing surface is arranged closer to the large-diameter annular portion. The small-diameter-side facing surface is arranged closer to the small-diameter annular portion and is arranged farther away from the outer peripheral surface of the tapered roller than the large-diameter-side facing surface. The intermediate facing surface connects the large-diameter-side facing surface and the small-diameter-side facing surface together and is inclined gradually away from the outer peripheral surface of the tapered roller with increasing distance from the large-diameter-side facing surface to the small-diameter-side facing surface.

According to the aspect described above, the cage bar of the cage has the first facing surface that faces the outer peripheral surface of the tapered roller housed in a cage pocket. In the first facing surface, the small-diameter-side facing surface arranged closer to the small-diameter annular portion is arranged farther away from the outer peripheral surface of the tapered roller than the large-diameter-side facing surface. Therefore, when the tapered roller bearing is assembled, the small-diameter-side portions of the tapered rollers can be inclined radially outward in the cage pockets. Thus, the tapered rollers can easily climb over the small rib of the inner ring, and the elastic deformation amount of the cage can be reduced as well. Accordingly, for example, damage to and a decrease in dimensional accuracy of the cage due to the elastic deformation can be suppressed. Further, the intermediate facing surface of the first facing surface is formed so as to be inclined gradually away from the outer peripheral surface of the tapered roller with increasing distance from the large-diameter-side facing surface to the small-diameter-side facing surface. Therefore, a change in a sectional shape between the large-diameter-side facing surface and the small-diameter-side facing surface is made gentle to suppress stress concentration when the cage is elastically deformed. Thus, the damage to the cage can be prevented more securely, and dies can be removed easily when the cage is molded with the dies.

In the aspect described above, the small-diameter annular portion may have a second facing surface arranged so as to face a roller small end face of the tapered roller. The second facing surface may include an outer facing surface and an inner facing surface. The outer facing surface is located relatively on the radially outer side. The inner facing surface is located relatively on a radially inner side and is arranged farther away from the roller small end face in a direction of a central axis of the tapered roller than the outer facing surface.

According to this structure, the inner facing surface of the second facing surface is arranged farther away from the roller small end face of the tapered roller than the outer facing surface. Therefore, when the tapered roller bearing is assembled, the small-diameter-side portions of the tapered rollers can be inclined radially outward in the cage pockets until the roller small end faces of the tapered rollers are brought into contact with the inner facing surface. Further, the inclination of the tapered rollers is limited such that the roller small end faces of the tapered rollers are brought into contact with the inner facing surface. Thus, the tapered rollers can be prevented from detaching from the inner ring after the tapered roller bearing is assembled.

In the structure described above, the second facing surface may include an intermediate facing surface that connects the outer facing surface and the inner facing surface together.

According to this structure, the rigidity of the cage increases, and the cage is difficult to deform elastically. However, the inclination of the tapered rollers is permitted by recesses of the cage bars, and therefore an operation of attaching an assembly of the cage and the tapered rollers to the inner ring can be performed easily. Further, the inclination of the tapered rollers is limited to a predetermined degree by the inner facing surface of the small-diameter annular portion, and therefore the tapered rollers can be prevented from detaching from the inner ring after the tapered roller bearing is assembled.

In the aspect described above, in the first facing surface, an inclination angle of the intermediate facing surface with respect to the large-diameter-side facing surface may be 5° or more and 10° or less. With this structure, stress concentration at a boundary portion between the large-diameter-side facing surface and the small-diameter-side facing surface can be prevented more securely when the cage is elastically deformed, and the dies can be removed more easily when the cage is molded with the dies.

In the aspect described above, in the first facing surface, the large-diameter-side facing surface and the small-diameter-side facing surface may be provided in parallel to each other. With this structure, the dies can be removed more easily when the cage is molded with the dies.

According to the present disclosure, the tapered roller bearing can easily be assembled while reducing the elastic deformation of the cage during the assembling.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a longitudinal sectional view illustrating a tapered roller bearing of related art.

DETAILED DESCRIPTION OF EMBODIMENTS

First Embodiment

Overall Structure of Tapered Roller Bearing

Figure 1:
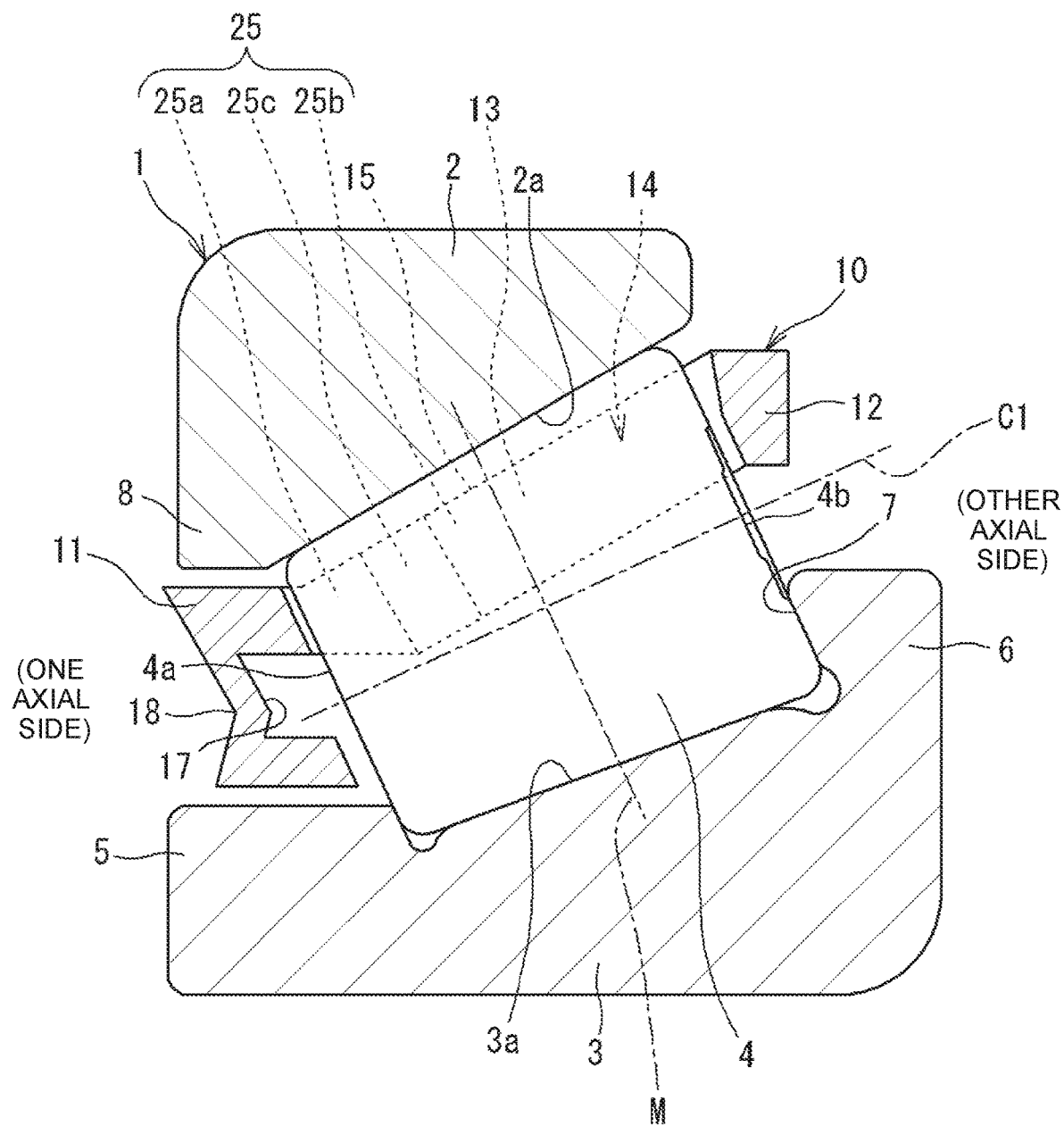
FIG. 1 is a longitudinal sectional view illustrating a tapered roller bearing according to a first embodiment of the present disclosure.

FIG. 1 is a longitudinal sectional view illustrating a tapered roller bearing 1 according to a first embodiment of the present disclosure. The tapered roller bearing 1 includes an inner ring 3, an outer ring 2, a plurality of tapered rollers 4, and an annular cage 10. The outer ring 2 is arranged on a radially outer side of the inner ring 3. The tapered rollers 4 are arranged between the inner ring 3 and the outer ring 2. The cage 10 retains the tapered rollers 4.

The inner ring 3 is an annular member formed by using bearing steel, steel for machine structural use, or the like. A tapered inner ring raceway surface 3a is formed on the outer periphery of the inner ring 3. The tapered rollers 4 roll along the inner ring raceway surface 3a. The inner ring 3 includes a cone front face rib (hereinafter referred to as a small rib) 5 and a cone back face rib (hereinafter referred to as a large rib) 6. The small rib 5 is provided on one axial side (left side in FIG. 1) of the inner ring raceway surface 3a, and protrudes radially outward. The large rib 6 is provided on the other axial side (right side in FIG. 1) of the inner ring raceway surface 3a, and protrudes radially outward.

The outer ring 2 is an annular member formed by using bearing steel, steel for machine structural use, or the like similarly to the inner ring 3. A tapered outer ring raceway surface 2a is formed on the inner periphery of the outer ring 2. The tapered rollers 4 roll along the outer ring raceway surface 2a. The outer ring raceway surface 2a and the inner ring raceway surface 3a are arranged so as to face each other.

The tapered roller 4 is formed by using bearing steel or the like. The tapered roller 4 rolls along the inner ring raceway surface 3a and the outer ring raceway surface 2a. The tapered roller 4 has a roller small end face 4a on the one axial side, and a roller large end face 4b on the other axial side. The roller small end face 4a has a small diameter. The roller large end face 4b has a large diameter. The roller large end face 4b is in sliding contact with a rib surface 7 of the large rib 6 of the inner ring 3.

Figure 2:
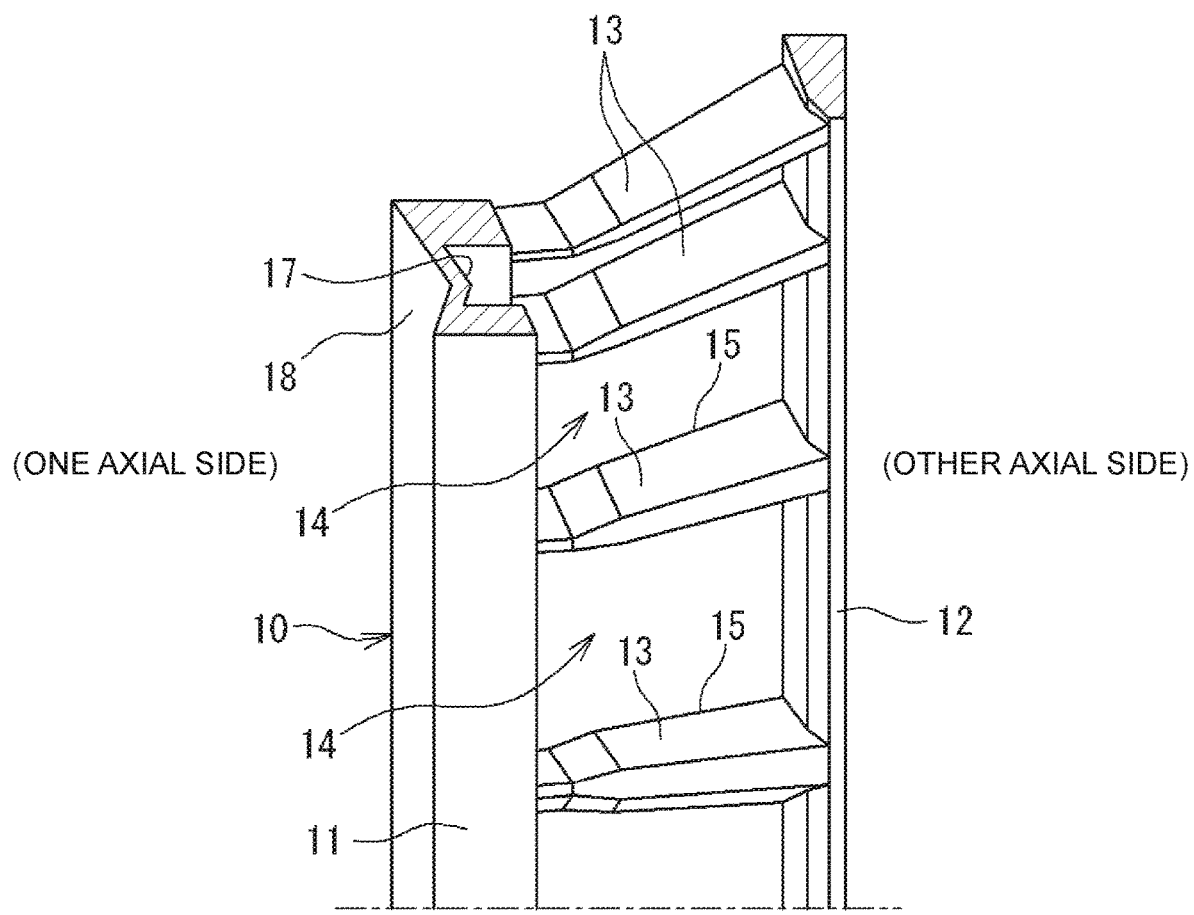
FIG. 2 is an explanatory drawing of a part of a cage of the tapered roller bearing that is viewed from a radially inner side.

FIG. 2 is an explanatory drawing of a part of the cage 10 that is viewed from a radially inner side. In FIG. 1 and FIG. 2, the cage 10 includes a small-diameter annular portion 11, a large-diameter annular portion 12, and cage bars 13. The small-diameter annular portion 11 is formed into a ring shape, and is provided on the one axial side of the cage 10. The large-diameter annular portion 12 is formed into a ring shape, and is provided on the other axial side of the cage 10. The small-diameter annular portion 11 and the large-diameter annular portion 12 are arranged at a predetermined distance away from each other in an axial direction.

The cage bar 13 couples the small-diameter annular portion 11 and the large-diameter annular portion 12 together. A plurality of cage bars 13 are provided with intervals in a circumferential direction. Spaces each formed between the small-diameter annular portion 11 and the large-diameter annular portion 12 and between two cage bars 13 and 13 adjacent to each other in the circumferential direction are cage pockets 14 that retain (house) the tapered rollers 4.

Figure 3:
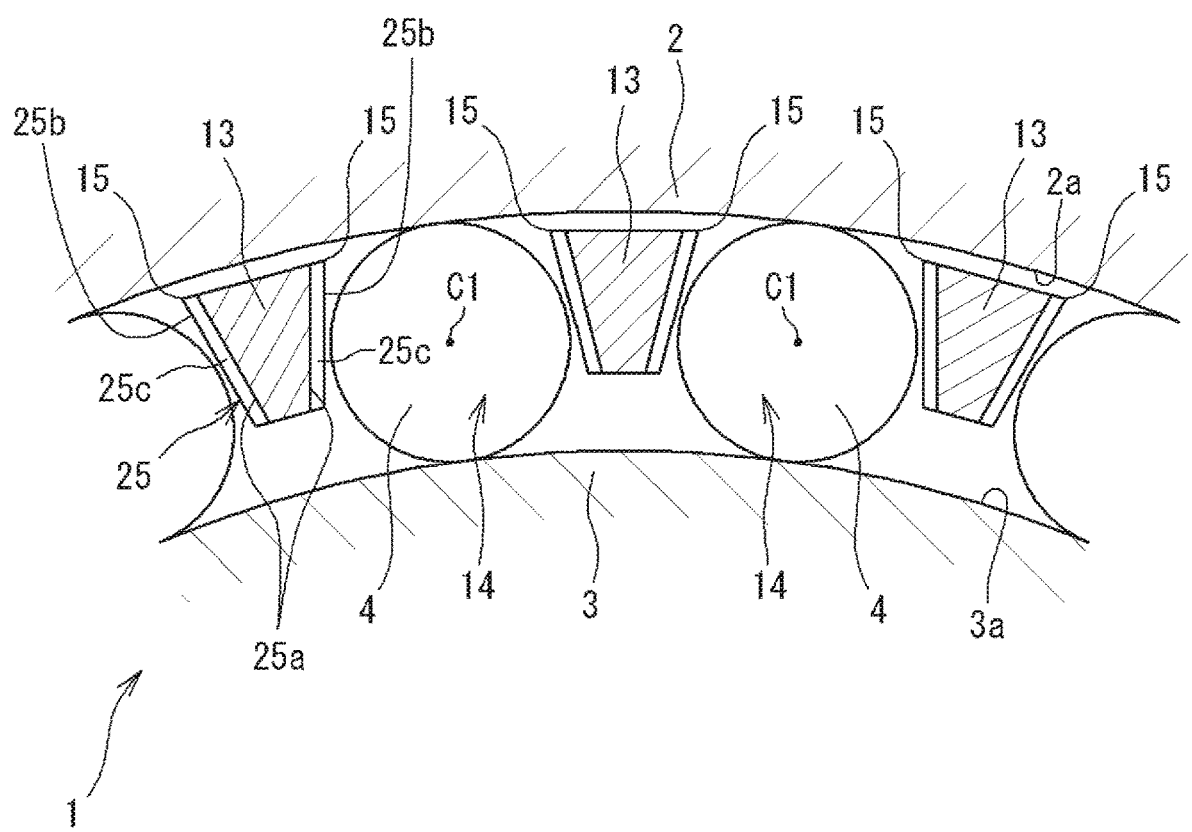
FIG. 3 is an explanatory drawing of a part of the tapered roller bearing that is viewed in a direction parallel to a central axis of each tapered roller.
Figure 4:
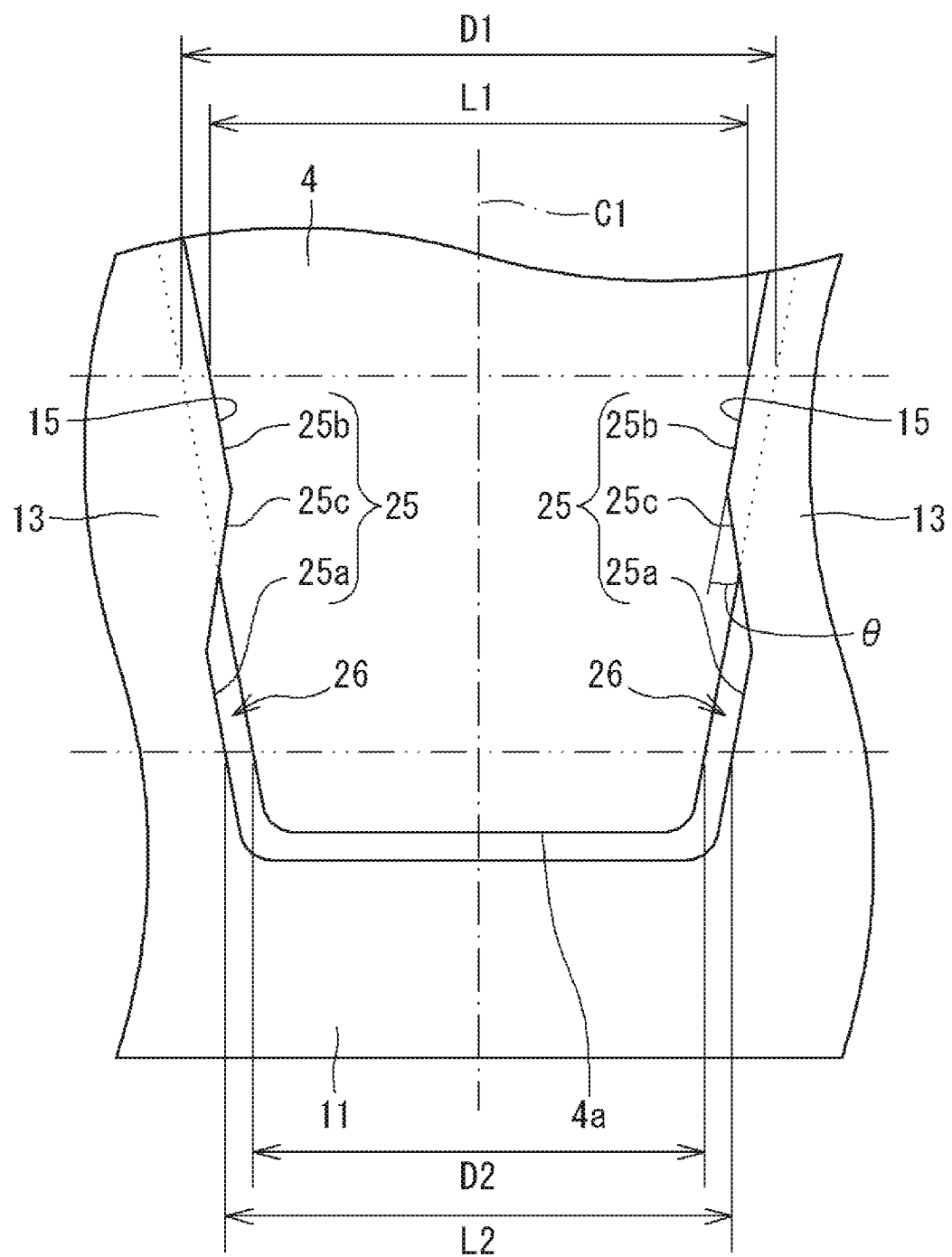
FIG. 4 is an explanatory drawing of parts of the tapered roller and the cage on a small-diameter side, which are viewed from a radially outer side.

FIG. 3 is an explanatory drawing of a part of the tapered roller bearing 1 that is viewed in a direction parallel to a central axis C1 of each tapered roller 4. FIG. 4 is an explanatory drawing of parts of the tapered roller 4 and the cage 10 on a small-diameter side, which are viewed from the radially outer side. The cage bar 13 of the cage 10 has a facing surface (first facing surface) 25 that faces the outer peripheral surface of the tapered roller 4 housed in the cage pocket 14. A recess 26 is formed at the end of the facing surface 25 on the small-diameter side (one axial side).

The facing surface 25 of the cage bar 13 includes a small-diameter-side facing surface 25a, a large-diameter-side facing surface 25b, and an intermediate facing surface 25c. The small-diameter-side facing surface 25a is formed closer to the small-diameter annular portion 11. The large-diameter-side facing surface 25b is formed closer to the large-diameter annular portion 12. The intermediate facing surface 25c is formed between the small-diameter-side facing surface 25a and the large-diameter-side facing surface 25b. The recess 26 is defined by the small-diameter-side facing surface 25a and the intermediate facing surface 25c.

Distances from the small-diameter-side facing surface 25a and the large-diameter-side facing surface 25b to the outer peripheral surface of the tapered roller 4 housed in the cage pocket 14 differ from each other. Specifically, the small-diameter-side facing surface 25a is more distant from the outer peripheral surface of the tapered roller 4, and the large-diameter-side facing surface 25b is closer to the outer peripheral surface of the tapered roller 4. The small-diameter-side facing surface 25a and the large-diameter-side facing surface 25b are formed in parallel to each other.

The intermediate facing surface 25c smoothly connects the large-diameter-side facing surface 25b and the small-diameter-side facing surface 25a together. Specifically, the intermediate facing surface 25c is a flat surface connecting the end of the large-diameter-side facing surface 25b on the small-diameter side (one axial side) and the end of the small-diameter-side facing surface 25a on a large-diameter side (other axial side). The intermediate facing surface 25c is formed so as to be inclined gradually away from the outer peripheral surface of the tapered roller 4 with increasing distance from the large-diameter-side facing surface 25b to the small-diameter-side facing surface 25a.

An inclination angle θ of the intermediate facing surface 25c with respect to the large-diameter-side facing surface 25b is set to 5° or more and 10° or less. As illustrated in FIG. 1, the boundary between the large-diameter-side facing surface 25b and the intermediate facing surface 25c is located on the small-diameter side (one axial side) of a middle position M on the tapered roller 4 in a direction of the central axis C1.

In the two cage bars 13 arranged on both circumferential sides of the tapered roller 4 housed in the cage pocket 14, the radially outer ends of the large-diameter-side facing surfaces 25b serve as roller retaining portions 15 that prevent the tapered roller 4 from detaching radially outward. Specifically, as illustrated in FIG. 4, a distance L1 between the radially outer ends (roller retaining portions 15) of the large-diameter-side facing surfaces 25b of the two cage bars 13 in a cross section perpendicular to the central axis C1 of the tapered roller 4 is smaller than a diameter D1 of the tapered roller 4 in the cross section. Therefore, if the tapered roller 4 in the cage pocket 14 is shifted radially outward, the tapered roller 4 is brought into contact with the pair of roller retaining portions 15 and 15, and is therefore prevented from detaching radially outward. In other words, the tapered roller 4 is positioned in a radial direction by the roller retaining portions 15.

A distance L2 between the radially outer ends of the small-diameter-side facing surfaces 25a of the two cage bars 13 is larger than a diameter D2 of the tapered roller 4 in the cross section. Therefore, no roller retaining portions are formed on the small-diameter-side facing surfaces 25a of the cage bars 13. In the cage pocket 14, the radially outward shift (inclination) of the small-diameter-side end of the tapered roller 4 is permitted. This structure is useful when the tapered roller bearing 1 is assembled. An assembling process for the tapered roller bearing 1 is described later.

As illustrated in FIG. 1, the cage 10 is positioned in the axial direction such that the large-diameter annular portion 12 is brought into contact with the roller large end faces 4b of the tapered rollers 4. That is, the tapered roller bearing 1 of this embodiment is a bearing in which the cage 10 is guided by rolling elements. The cage 10 may be positioned in the radial direction such that the radially outer surface of the cage 10 (or its part) is brought into contact with the inner peripheral surface of the outer ring 2. That is, the tapered roller bearing 1 may be a bearing in which the cage 10 is guided by the outer ring in the radial direction.

The cage 10 of this embodiment is made of a synthetic resin, and can be formed by injection molding with dies. In order to impart resistance to lubricating oil (oil resistance), the cage 10 may be made of, for example, a polyphenylene sulfide resin (PPS), or may be made of a fiber reinforced plastic (FRP). Therefore, the cage 10 is hard and relatively unlikely to be deformed elastically.

In FIG. 1, the cage 10 is provided in an annular space formed between the inner ring 3 and the outer ring 2 (hereinafter referred to also as a bearing interior), houses one tapered roller 4 in each cage pocket 14, and retains the tapered rollers 4 so that the tapered rollers 4 are arranged with equal intervals in the circumferential direction. The small-diameter annular portion 11 of this embodiment is located between an end 8 of the outer ring 2 on the one axial side (hereinafter referred to also as an outer ring end 8) and the small rib 5 that is the end of the inner ring 3 on the one axial side.

Figure 5:
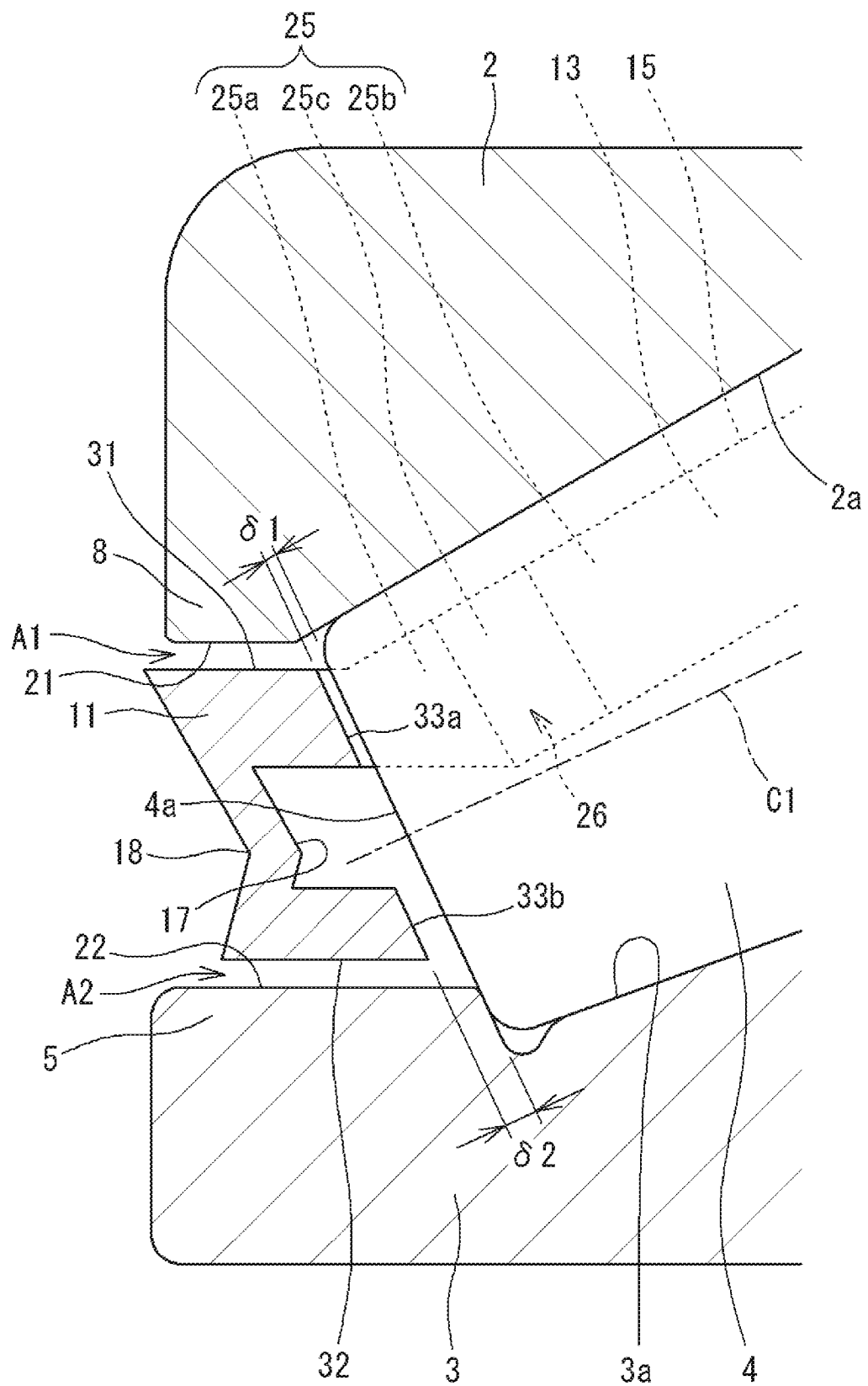
FIG. 5 is an enlarged longitudinal sectional view illustrating a small-diameter annular portion of the cage and its periphery.

FIG. 5 is an enlarged sectional view illustrating the small-diameter annular portion 11 of the cage 10 and its periphery. The small-diameter annular portion 11 of this embodiment has an annular surface on an outer side (hereinafter referred to as an outer annular surface 31), which faces an inner peripheral surface 21 of the outer ring end 8 with an annular clearance A1 therebetween. The small-diameter annular portion 11 also has an annular surface on an inner side (hereinafter referred to as an inner annular surface 32), which faces an outer peripheral surface 22 of the small rib 5 with an annular clearance A2 therebetween.

In this embodiment, the inner peripheral surface 21 of the outer ring end 8 and the outer annular surface 31 of the small-diameter annular portion 11 are straight cylindrical surfaces about a center line of the tapered roller bearing 1. The outer peripheral surface 22 of the small rib 5 and the inner annular surface 32 of the small-diameter annular portion 11 are straight cylindrical surfaces about the center line.

The radial thickness dimension of the small-diameter annular portion 11 is larger than that of the large-diameter annular portion 12. The inner peripheral surface 21 of the outer ring end 8 and the outer annular surface 31 of the small-diameter annular portion 11 are close to each other, and the radial dimension of the annular clearance A1 on the radially outer side is set infinitesimal (for example, less than 1 mm). The outer peripheral surface 22 of the small rib 5 and the inner annular surface 32 of the small-diameter annular portion 11 are close to each other, and the radial dimension of the annular clearance A2 on the radially inner side is set infinitesimal (for example, less than 1 mm).

In FIG. 5, a first recess 17 is provided in the face of the small-diameter annular portion 11 that is closer to the tapered roller 4 (on the other axial side). The first recess 17 faces the roller small end face 4a of the tapered roller 4, and is open to the roller small end face 4a. A second recess 18 is provided in the face of the small-diameter annular portion 11 that is opposite to the tapered roller 4 (on the one axial side). The recesses 17 and 18 reduce the rigidity of the small-diameter annular portion 11.

The second recess 18 is formed into a V-shape in cross section by two straight lines. The first recess 17 is formed substantially into an M-shape in cross section with a portion formed into a V-shape conforming to the second recess 18 and portions linearly extending from both radial ends of the V-shaped portion to the other axial side (right side in FIG. 5).

Faces 33a and 33b of the small-diameter annular portion 11 on the other axial side are facing surfaces (second facing surfaces) that face the roller small end face 4a of the tapered roller 4. The outer facing surface 33a located on the radially outer side of the first recess 17 is arranged in parallel to the roller small end face 4a of the tapered roller 4. The outer facing surface 33a faces the roller small end face 4a on the radially outer side of the central axis C1 of the tapered roller 4.

The inner facing surface 33b located on the radially inner side of the first recess 17 is also arranged in parallel to the roller small end face 4a. The inner facing surface 33b faces the roller small end face 4a on the radially inner side of the central axis C1 of the tapered roller 4.

The outer facing surface 33a is arranged with a clearance δ1 from the roller small end face 4a of the tapered roller 4. The inner facing surface 33b is arranged with a clearance δ2 from the roller small end face 4a. The clearance δ1 between the outer facing surface 33a and the roller small end face 4a and the clearance δ2 between the inner facing surface 33b and the roller small end face 4a have a relationship of δ1<δ2. Thus, the inner facing surface 33b is arranged farther away from the roller small end face 4a than the outer facing surface 33a. This structure is mainly useful when the tapered roller bearing 1 is assembled. The assembling process for the tapered roller bearing 1 is described below.

Figure 6A:
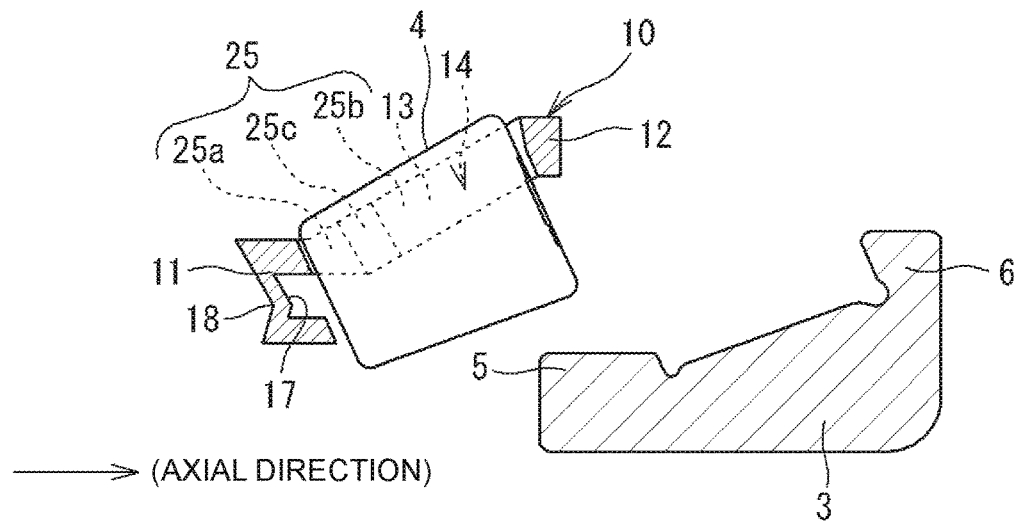
FIG. 6A is an explanatory drawing of an assembling process for the tapered roller bearing.
Figure 6B:
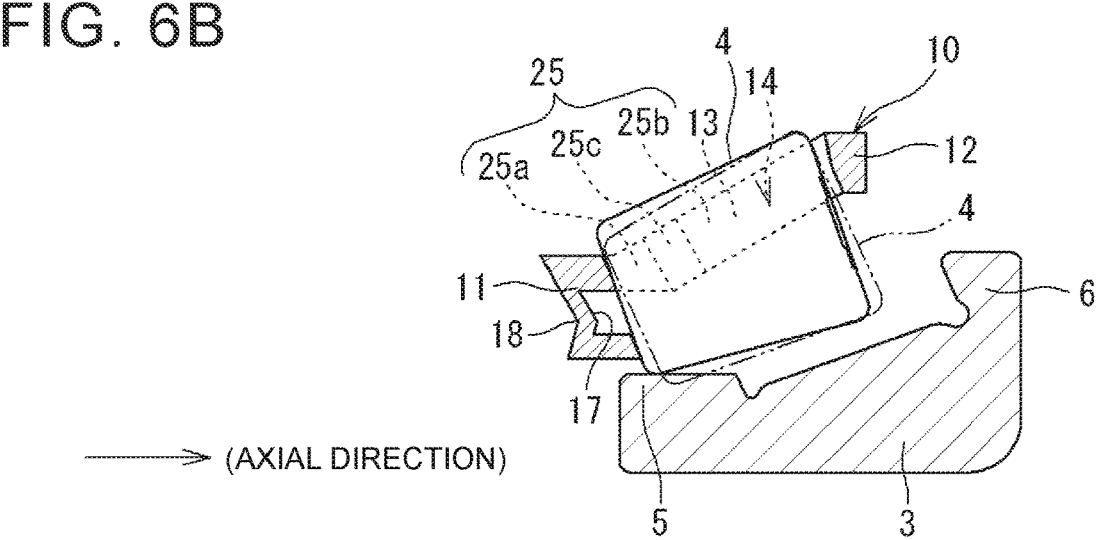
FIG. 6B is an explanatory drawing of the assembling process for the tapered roller bearing.
Figure 6C:
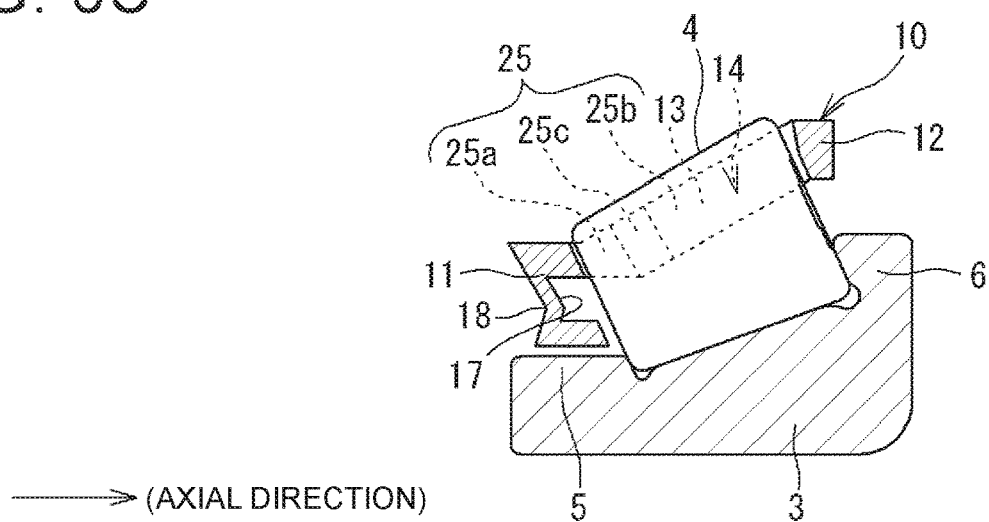
FIG. 6C is an explanatory drawing of the assembling process for the tapered roller bearing.

FIG. 6A to FIG. 6C are explanatory drawings of the assembling process for the tapered roller bearing 1 illustrated in FIG. 1. To assemble the tapered roller bearing 1, the tapered rollers 4 are first housed in the cage pockets 14 of the cage 10 as illustrated in FIG. 6A. Then, the inner ring 3 and the assembly of the cage 10 and the tapered rollers 4 are relatively moved closer to each other along the axial direction.

Since the recesses 26 (small-diameter-side facing surfaces 25a and intermediate facing surfaces 25c) are formed in the cage bars 13 of the cage 10, the tapered rollers 4 are inclined in the cage pockets 14 so that the small-diameter-side ends of the tapered rollers 4 are shifted radially outward. That is, each tapered roller 4 changes its posture from a state indicated by a long dashed double-short dashed line in FIG. 6B to a state indicated by a continuous line in FIG. 6B. Thus, the tapered roller 4 climbs on the small rib 5 of the inner ring 3. Then, the tapered roller 4 is arranged on the inner ring raceway surface 3a by passing over the small rib 5 as illustrated in FIG. 6C.

Then, the outer ring 2 and the inner ring unit integrally having the inner ring 3, the tapered rollers 4, and the cage 10 are attached together by being relatively moved closer to each other in the axial direction. Thus, the tapered roller bearing 1 is assembled.

In this embodiment, in the step of attaching together the inner ring 3 and the assembly of the cage 10 and the tapered rollers 4, the tapered rollers 4 are inclined in the cage pockets 14 when the tapered rollers 4 climb over the small rib 5 of the inner ring 3. Therefore, the tapered rollers 4 can easily climb over the small rib 5 of the inner ring 3, and the elastic deformation amount of the cage 10 can be reduced as well. Thus, for example, damage to and a decrease in dimensional accuracy of the cage 10 can be suppressed.

Since the elastic deformation amount of the cage 10 can be reduced, it is possible to reduce a load when the inner ring 3 is press-fitted along the axial direction on the radially inner side of the tapered rollers 4 housed in the cage 10 (load necessary for the tapered rollers 4 to climb on the small rib 5). Therefore, the tapered roller bearing 1 is assembled more easily. In particular, the cage 10 of this embodiment is made of a hard synthetic resin in order to increase the oil resistance. Thus, it is more effective that the tapered rollers 4 are inclined in the cage pockets 14 to reduce the elastic deformation amount of the cage 10.

As described above, the first recess 17 and the second recess 18 are formed in the small-diameter annular portion 11 of the cage 10 to reduce the rigidity of the cage 10. Therefore, when the tapered rollers 4 climb over the small rib 5 of the inner ring 3, the cage 10 is elastically deformed more easily than a case where the recesses 17 and 18 are not formed. Thus, it is possible to further reduce the press-fitting load necessary for the tapered rollers 4 to climb over the small rib 5. Accordingly, the tapered roller bearing 1 can be assembled more easily.

If the tapered rollers 4 are easily inclined in the cage pockets 14, there is a higher possibility, after the tapered roller bearing 1 is assembled, that the tapered rollers 4 are displaced away from the inner ring raceway surface 3a and the tapered rollers 4 climb over the small rib 5 to detach. In this embodiment, the inclination of the tapered rollers 4 is limited such that the tapered rollers 4 are brought into contact with the inner facing surface 33b of the small-diameter annular portion 11 of the cage 10. Thus, the detachment of the tapered rollers 4 can be suppressed.

Figure 7:
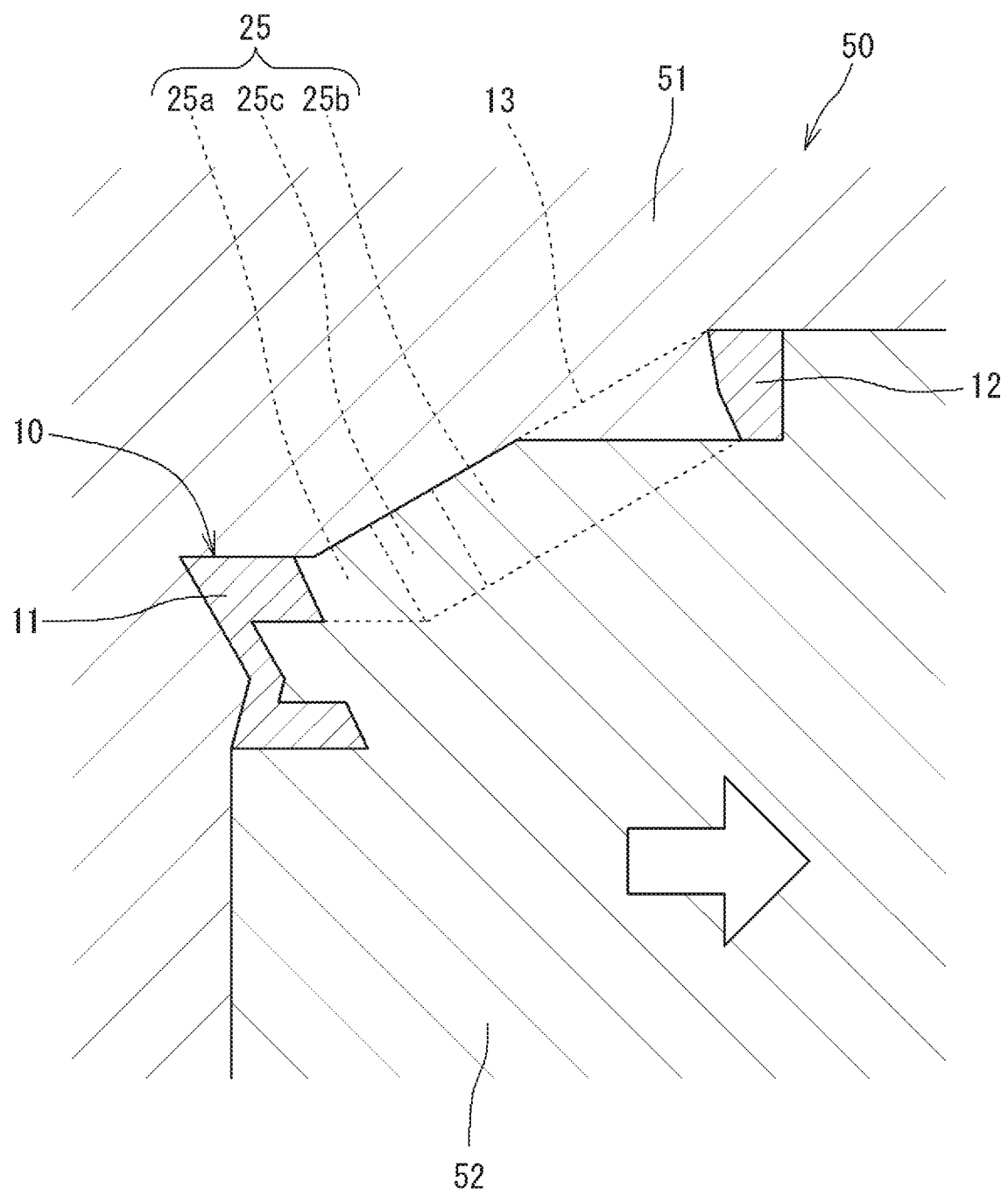
FIG. 7 is a sectional view illustrating a molding die for the cage.

FIG. 7 is a sectional view illustrating a molding die for the cage 10. A molding die 50 includes a first die 51 and a second die 52, and a cavity for molding the cage 10 is formed between the first die 51 and the second die 52. The small-diameter-side facing surface 25a and the intermediate facing surface 25c of the first facing surface 25 of each cage bar 13 of the cage 10 are molded by the second die 52. When the dies are removed, the second die 52 moves relative to the first die 51 in an arrow direction.

The intermediate facing surface 25c formed on each cage bar 13 of the cage 10 is formed on an inclined surface connecting the large-diameter-side facing surface 25b and the small-diameter-side facing surface 25a together. Therefore, when the second die 52 is removed in the arrow direction, the second die 52 is hardly caught on the intermediate facing surface 25c. Thus, the second die 52 can be removed smoothly. The small-diameter-side facing surface 25a and the large-diameter-side facing surface 25b are formed in parallel to each other, and therefore the second die 52 can be removed more smoothly.

In the first facing surface 25, the inclination angle θ of the intermediate facing surface 25c with respect to the large-diameter-side facing surface 25b is set to 5° or more and 10° or less. The reasons are as follows. If the inclination angle θ is less than 5°, it is difficult to sufficiently secure the depth of the recess 26. If the inclination angle θ exceeds 10°, it is difficult to remove the molding die for the cage 10 as described above. Further, the cross section between the large-diameter-side facing surface 25b and the small-diameter-side facing surface 25a changes abruptly, and stress concentration is likely to occur due to elastic deformation of the cage 10.

Second Embodiment

Figure 8:
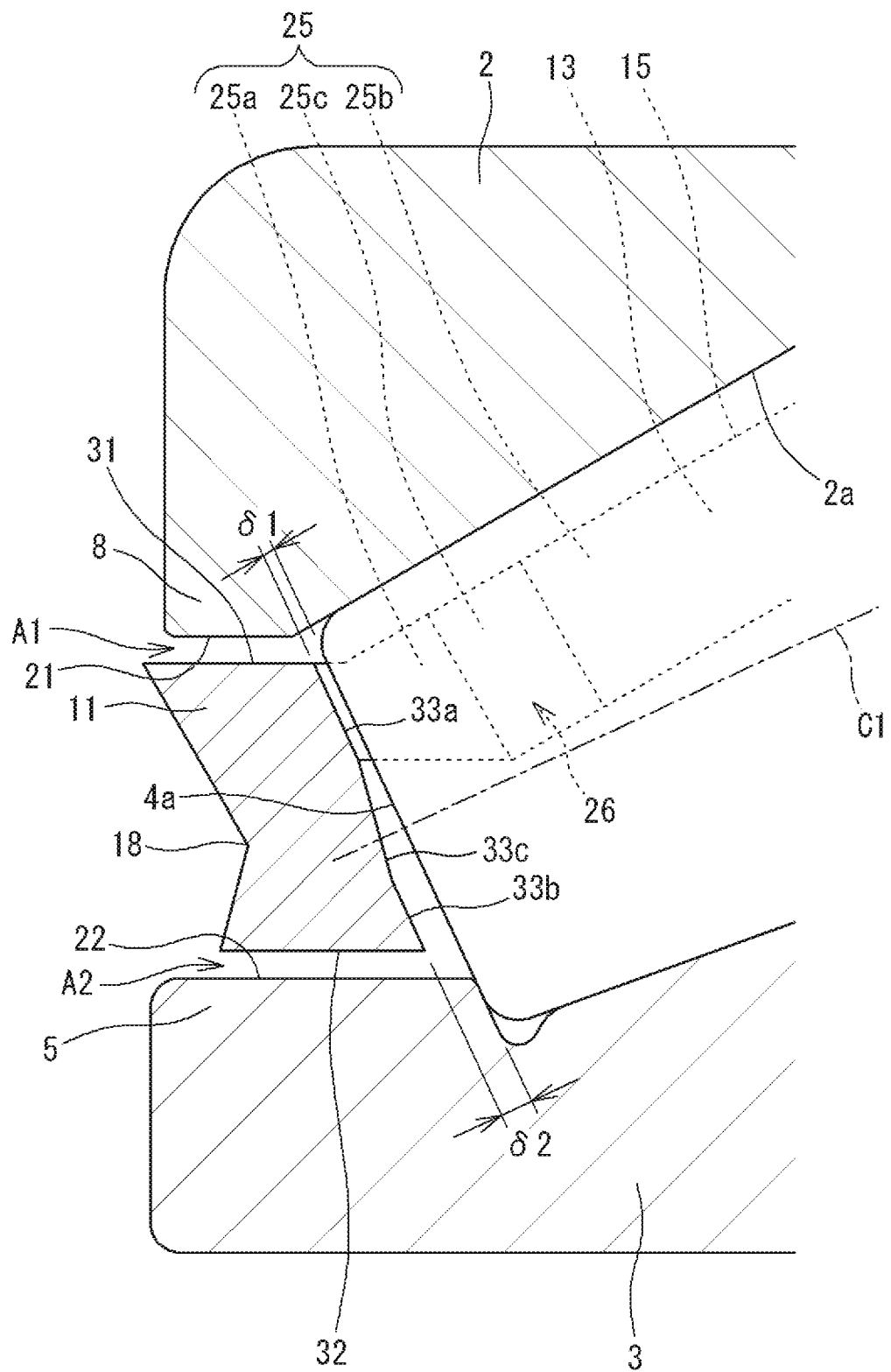
FIG. 8 is an enlarged longitudinal sectional view illustrating a small-diameter annular portion of a cage and its periphery according to a second embodiment.

FIG. 8 is a longitudinal sectional view illustrating a cage 10 according to a second embodiment. In the embodiment illustrated in FIG. 8, the first recess is not formed in the small-diameter annular portion 11 of the cage 10, and the outer facing surface 33a and the inner facing surface 33b that face the roller small end face 4a of the tapered roller 4 are connected together by an intermediate facing surface 33c. In this embodiment, the rigidity of the cage 10 is higher than that in the first embodiment illustrated in FIG. 5. Therefore, the cage 10 is difficult to deform elastically. However, the inclination of the tapered rollers 4 is permitted by the recesses 26 of the cage bars 13, and therefore the operation of attaching the assembly of the cage 10 and the tapered rollers 4 to the inner ring 3 can be performed easily. Further, the inclination of the tapered rollers 4 is limited to a predetermined degree by the inner facing surface 33b of the small-diameter annular portion 11, and therefore the tapered rollers 4 can be prevented from detaching from the inner ring 3 after the tapered roller bearing 1 is assembled.

The embodiments disclosed above are illustrative but are not limitative in all respects. That is, the tapered roller bearing of the present disclosure is not limited to the illustrated forms, but other forms may be adopted within the scope of the applicable embodiment. The shapes of the recesses 17 and 18 may be changed to other shapes than the illustrated shapes. Further, other forms may be adopted for the roller retaining portions 15 that prevent the tapered roller 4 housed in the cage pocket 14 from detaching radially outward.

What is claimed is:

1. A tapered roller bearing comprising:
an inner ring including a small rib that is provided on a first axial side and protrudes radially outward and a large rib that is provided on a second axial side and protrudes radially outward;
an outer ring arranged on a radially outer side of the inner ring;
a plurality of tapered rollers arranged between the inner ring and the outer ring; and
an annular cage including a small-diameter annular portion on the first axial side, a large-diameter annular portion on the second axial side, and a plurality of cage bars that couple the small-diameter annular portion and the large-diameter annular portion together, the annular cage being configured to house each of the tapered rollers between the large-diameter annular portion and the small-diameter annular portion and between the cage bars adjacent to each other in a circumferential direction, wherein
the cage bar has a first facing surface that faces an outer peripheral surface of the tapered roller that is housed,
the first facing surface includes a large-diameter-side facing surface arranged closer to the large-diameter annular portion, a small-diameter-side facing surface arranged closer to the small-diameter annular portion and arranged farther away from the outer peripheral surface of the tapered roller than the large-diameter-side facing surface, and an intermediate facing surface that connects the large-diameter-side facing surface and the small-diameter-side facing surface together and is inclined gradually away from the outer peripheral surface of the tapered roller with increasing distance from the large-diameter-side facing surface to the small-diameter-side facing surface,
the small-diameter annular portion has a second facing surface arranged so as to face a roller small end face of the tapered roller, and
the second facing surface includes an outer facing surface located relatively on the radially outer side, and an inner facing surface located relatively on a radially inner side and arranged farther away from the roller small end face in a direction of a central axis of the tapered roller than the outer facing surface.

2. The tapered roller bearing according to claim 1, wherein the second facing surface includes an intermediate facing surface that connects the outer facing surface and the inner facing surface together.

3. The tapered roller bearing according to claim 1, wherein, in the first facing surface, an inclination angle of the intermediate facing surface with respect to the large-diameter-side facing surface is 5° or more and 10° or less.

4. The tapered roller bearing according to claim 1, wherein, in the first facing surface, the large-diameter-side facing surface and the small-diameter-side facing surface are provided in parallel to each other.

* * * * *